(12) United States Patent
Masuda et al.

(10) Patent No.: US 10,175,443 B1
(45) Date of Patent: Jan. 8, 2019

(54) OPTICAL FIBER RACK

(71) Applicants: SEI Optifrontier Co., Ltd., Yokohama-shi, Kanagawa (JP); SUMITOMO ELECTRIC INDUSTRIES, LTD., Osaka-shi, Osaka (JP); Japan Communication Accessories Manufacturing Co., Ltd., Komaki-shi, Aichi (JP); SUMITOMO ELECTRIC LIGHTWAVE CORP., Raleigh, NC (US)

(72) Inventors: Kazuya Masuda, Yokohama (JP); Takayasu Yamauchi, Osaka (JP); Takayuki Yokochi, Komaki (JP); Takashi Kondo, Raleigh, NC (US)

(73) Assignees: SEI OPTIFRONTIER CO., LTD., Yokohama-shi, Kanagawa (JP); SUMITOMO ELECTRIC INDUSTRIES, LTD., Osaka-shi, Osaka (JP); JAPAN COMMUNICATION ACCESSORIES MANUFACTURING CO., LTD., Komaki-shi, Aichi (JP); SUMITOMO ELECTRIC LIGHTWAVE CORP., Raleigh, NC (US)

( * ) Notice: Subject to any disclaimer, the term of this patent is extended or adjusted under 35 U.S.C. 154(b) by 0 days.

(21) Appl. No.: 15/893,940

(22) Filed: Feb. 12, 2018

(51) Int. Cl.
*G02B 6/44* (2006.01)

(52) U.S. Cl.
CPC ......... *G02B 6/4471* (2013.01); *G02B 6/4446* (2013.01); *G02B 6/4452* (2013.01); *G02B 6/4455* (2013.01)

(58) Field of Classification Search
CPC .. G02B 6/4446; G02B 6/4452; G02B 6/4455; G02B 6/4471
See application file for complete search history.

(56) References Cited

U.S. PATENT DOCUMENTS 6,556,763 B1 * 4/2003 Puetz ................... G02B 6/4452
385/134
6,614,978 B1 9/2003 Caveney
(Continued)

FOREIGN PATENT DOCUMENTS

JP 2000-231020 A 8/2000
JP 2000-231021 A 8/2000
(Continued)

OTHER PUBLICATIONS

U.S. Office Action dated Sep. 21, 2018 that issued in U.S. Appl. No. 15/893,912 including a Double Patenting Rejection on pp. 2-4.

*Primary Examiner* — Daniel Petkovsek
(74) *Attorney, Agent, or Firm* — Drinker Biddle & Reath LLP

(57) ABSTRACT

An optical fiber rack includes a rack part on which a plurality of termination units are located, a first optical fiber housing part in which extra length wiring parts of a plurality of first optical fibers are housed, a second optical fiber housing part in which an extra length wiring part of a second optical fiber connected with any of the plurality of termination units is housed, a partition plate partitioning the first optical fiber housing part from the second optical fiber housing part, and, a plurality of optical fiber guides attached to the partition plate and arranged in the vertical direction. The optical fiber guide comprises a first guide part housing the first optical fibers toward to the first optical fiber housing part, and a second guide part housing the second optical fiber passing through an opening provided in the partition plate.

6 Claims, 14 Drawing Sheets

(56) References Cited

U.S. PATENT DOCUMENTS

| | | | | |
|---|---|---|---|---|
| 6,633,718 | B1* | 10/2003 | Thom | G02B 6/4459 |
| | | | | 385/136 |
| 6,853,795 | B2* | 2/2005 | Dagley | G02B 6/4452 |
| | | | | 385/134 |
| 9,389,384 | B2* | 7/2016 | Solheid | G02B 6/4452 |
| 2013/0028567 | A1* | 1/2013 | Parikh | G02B 6/4452 |
| | | | | 385/135 |

FOREIGN PATENT DOCUMENTS

| | | |
|---|---|---|
| JP | 2001-4849 A | 1/2001 |
| JP | 2003-215352 A | 7/2003 |
| JP | 2008-52195 A | 3/2008 |
| JP | 2008-224892 A | 9/2008 |
| JP | 2012-53098 A | 3/2012 |
| JP | 2012-108176 A | 6/2012 |

* cited by examiner

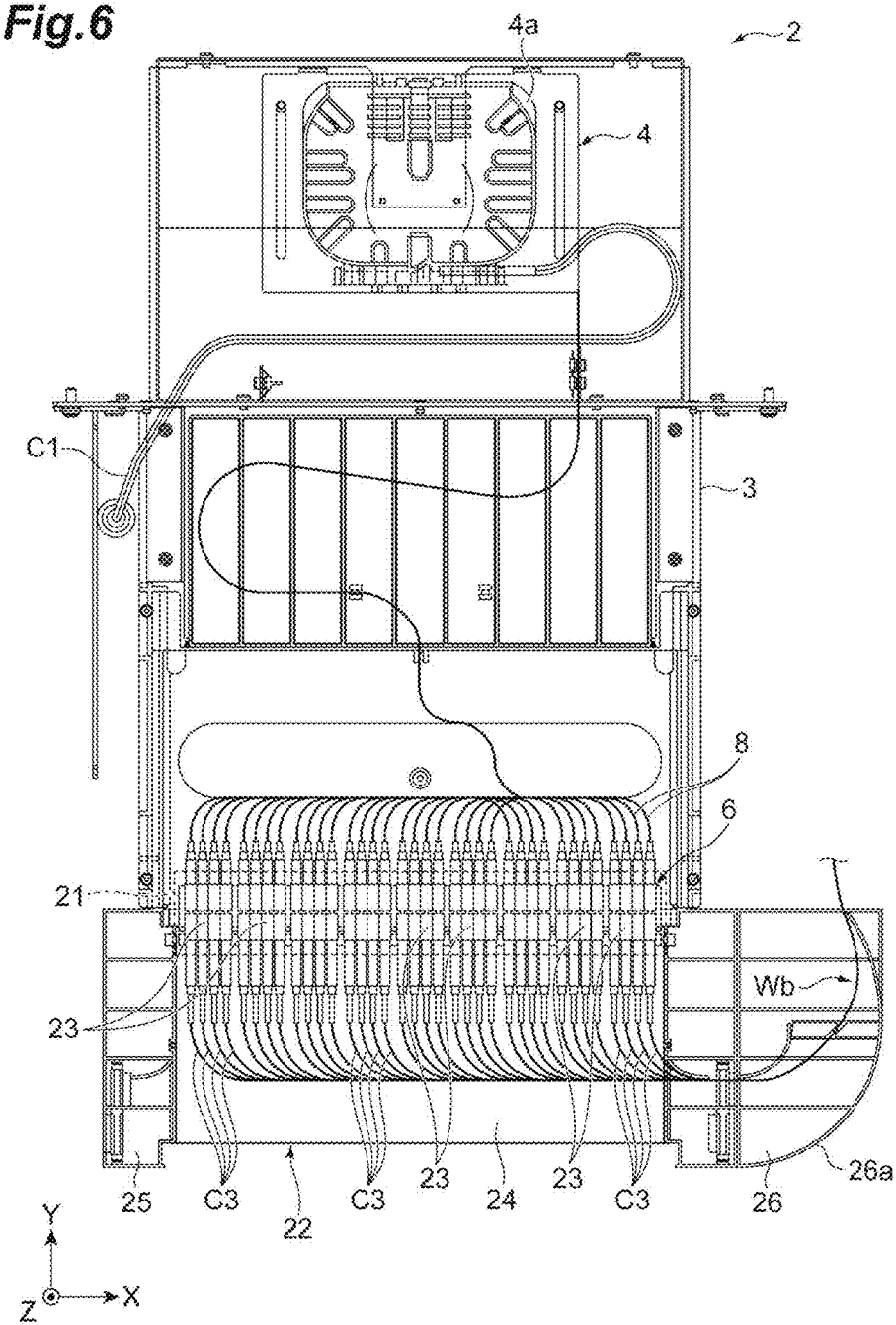

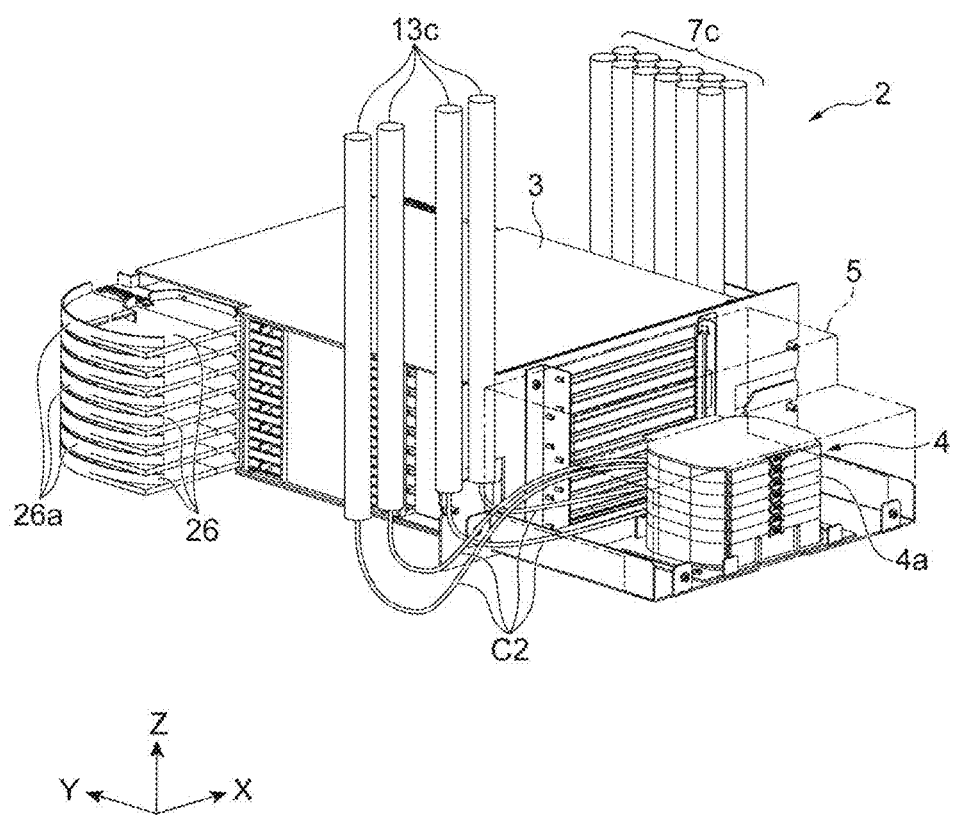

Fig.10
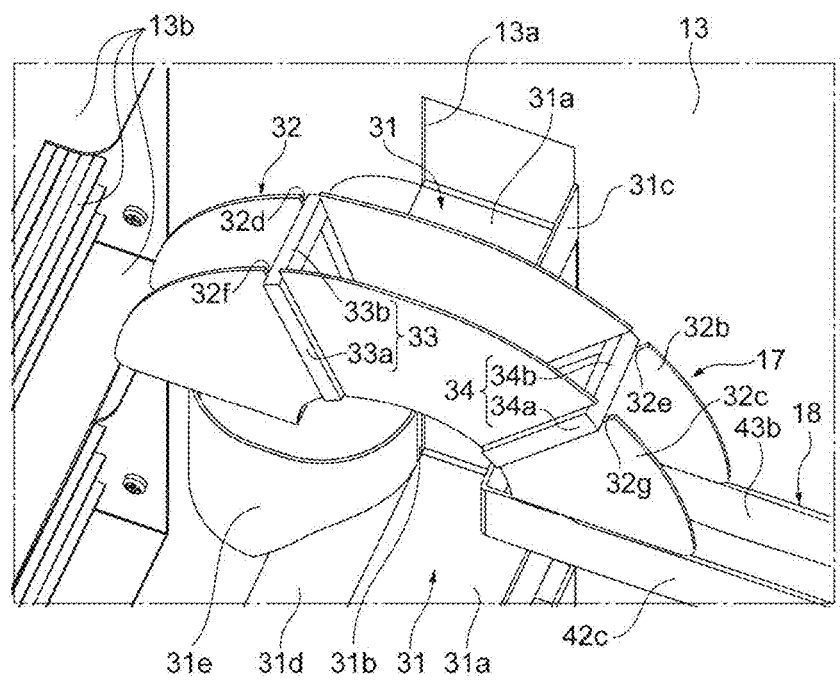
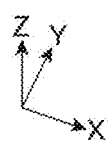

US 10,175,443 B1

OPTICAL FIBER RACK

TECHNICAL FIELD

The present invention relates to an optical fiber rack.

BACKGROUND

For example, Japanese Unexamined Patent Publication No. 2012-53098 has proposed an optical wiring board in which a plurality of adapters are arranged along a vertical direction. In this optical wiring board, a optical fiber cord connected to the adapter is supported by a gripping member, rises after sagging along a downward guidance bending part to be suspended by a suspension means. This intends to stably hold a U-shaped extra length wiring part of a connection side optical fiber cord between the downward guidance bending part and the suspension means.

SUMMARY

An optical fiber rack according to an aspect of the present invention comprises a rack part on which a plurality of termination units arranged in a vertical direction are located, a first optical fiber housing part in which extra length wiring parts of a plurality of first optical fibers connected with each of the plurality of termination units are housed, a second optical fiber housing part in which an extra length wiring part of a second optical fiber connected with any of the plurality of termination units is housed, a partition plate partitioning the first optical fiber housing part from the second optical fiber housing part; and a plurality of optical fiber guides attached to a surface of the partition plate on a side of the first optical fiber housing part, the plurality of optical fiber guides being arranged in the vertical direction to respectively correspond to the termination units, in which the optical fiber guide comprises a first guide part housing the first optical fibers toward to the first optical fiber housing part, and a second guide part housing the second optical fibers, the second optical fibers passing through an opening provided in the partition plate, the second guide part is attached to the partition plate, and has a groove shape extending to protrude from the partition plate, the first guide part is provided at a leading end of the second guide part, and has a groove shape extending in a direction crossing a protruding direction of the second guide part, and the first guide part and the second guide part are partitioned from each other by a wall part of the first guide part on a side of the second guide part.

BRIEF DESCRIPTION OF THE DRAWINGS

FIG. 6 is a diagram illustrating a part of an inner side of the termination unit;

FIG. 7 is a diagram illustrating a termination unit located at a lowermost side in a rack part;

FIG. 10 is an enlarged perspective view of an optical fiber guide;

DETAILED DESCRIPTION

Technical Problem of the Present Disclosure

Figure 1:
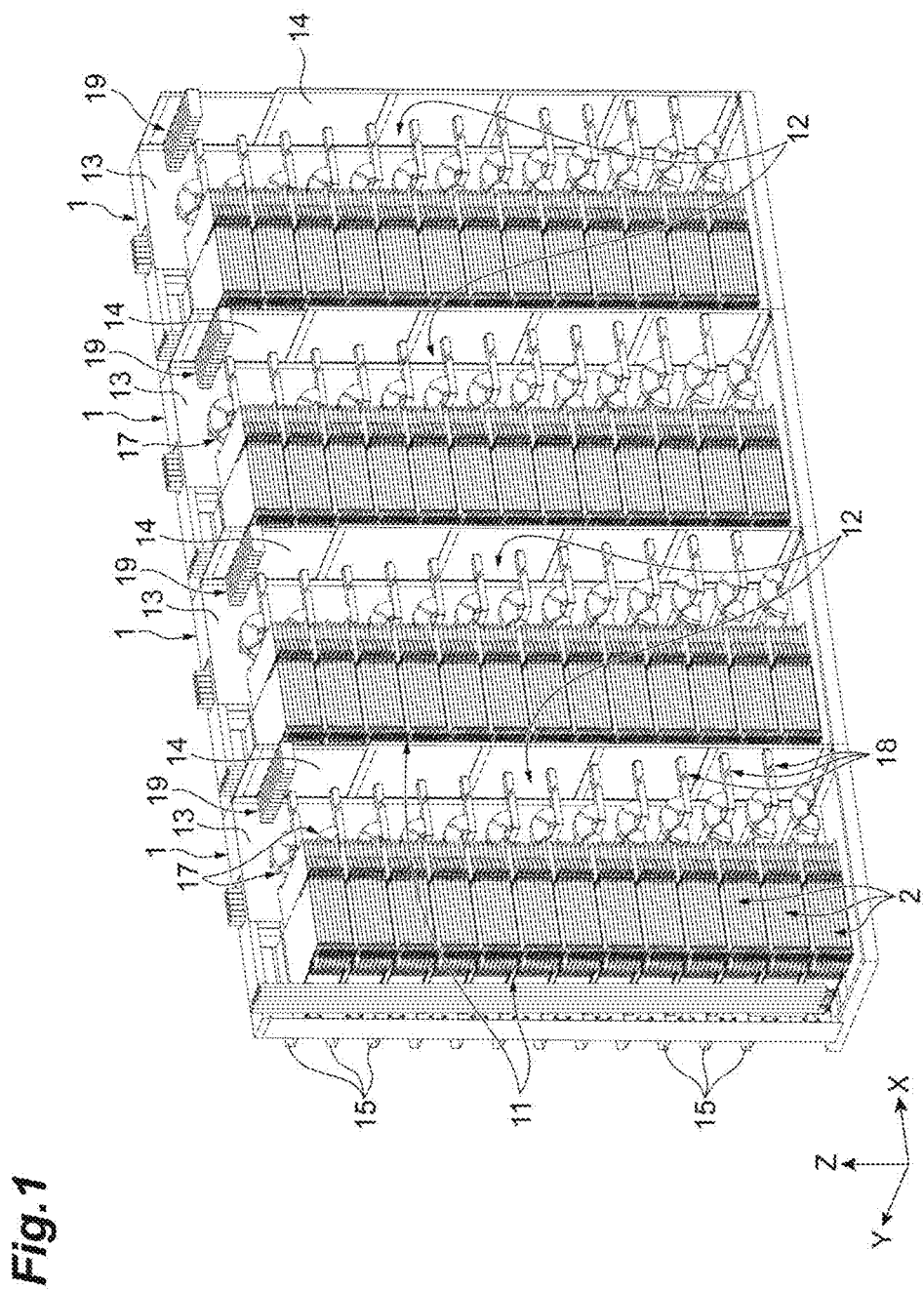
FIG. 1 is a diagram illustrating a state where optical fiber racks according to an embodiment are arranged in one direction.

In as disclosed in Japanese Unexamined Patent Publication No. 2012-53098, the termination unit as an adapter may be connected to, for example, both a plurality of connection side optical fiber cords connected with an external device or the like (e.g., a server) and a optical fiber cord connected with another termination unit (cross-connect optical fiber). In this case, both the above optical fiber cords may be probably mixed to cause entangling or the like.

Then, an object of the present disclosure is to provide an optical fiber rack capable of easily distinguishing a plurality of optical fibers used for different purposes.

Effects of the Present Disclosure

According to the present disclosure, it is possible to provide an optical fiber rack capable of easily distinguishing a plurality of optical fibers used for different purposes.

Description of Embodiment of the Present Disclosure

Firstly, a description is given of contents of embodiments of the present invention in a listing manner.

An embodiment of the invention is an optical fiber rack comprises a rack part, a plurality of termination units arranged in a vertical direction being located on the rack part, a first optical fiber housing part, extra length wiring parts of a plurality of first optical fibers connected with each of the plurality of termination units being housed in the first optical fiber housing part, a second optical fiber housing part, extra length wiring parts of second optical fibers connected with any of the plurality of termination units being housed in the second optical fiber housing part, a partition plate partitioning the first optical fiber housing part from the second optical fiber housing part; and a plurality of optical fiber guides attached to a surface of the partition plate on a side of the first optical fiber housing part, and arranged in the vertical direction to respectively correspond to the termination units, in which the optical fiber guide comprises a first guide part housing the first optical fibers toward to the first optical fiber housing part, and a second guide part housing the second optical fibers, the second optical fibers passing through an opening provided in the partition plate, the second guide part is attached to the partition plate, and has a groove shape extending to protrude from the partition plate, the first guide part is provided at a leading end of the second guide part, and has a groove shape extending in a direction crossing a protruding direction of the second guide part, and the first guide part and the second guide part are partitioned from each other by a wall part of the first guide part on a side of the second guide part.

In this optical fiber rack, in a case that both the first optical fibers and the second optical fiber are connected with the termination unit, the first optical fibers and the second optical fiber are branched from each other by the optical fiber guide provided on the surface of the partition plate on the side of the first optical fiber housing part. Here, the first guide part and the second guide part are partitioned from each other by the wall part of the first guide part on the side of the second guide part. This can preferably prevent the second optical fiber from entering the first optical fiber housing part to mingle with the first optical fibers. Therefore, the first optical fiber and the second optical fiber used for the purposes different from each other can be easily distinguished in maintenance, for example.

One of the surface of the partition plate and the optical fiber guide may be provided with a curved plate, the curved plate being curved to restrict a position of the second optical fibers. In this case, the second optical fiber can be well guided to the second guide part, which is unlikely to cause breakage and the like of the second optical fiber.

The optical fiber guide further may comprise a restriction part restricting a motion of the first optical fibers housed in the first guide part in the vertical direction. In this case, the first optical fibers can be prevented from dropping out of the first guide part, or the like. In addition, the optical fiber guide may include at least two restriction parts. By doing so, even if one restriction part is released, unless the other is released, the optical fiber bundle can be continuously held, and therefore, when a part of the optical fibers is separated from the optical fiber bundle, or when a part of the optical fibers is added to the optical fiber bundle, an unexpected stress caused by the optical fiber bundle moving applied to the optical fiber bundle can be reduced.

A protruding amount of the second guide part may be larger at the optical fiber guide provided lower in the vertical direction. In this case, in the first optical fiber housing part, the positions of the first optical fibers in the protruding direction of the second guide part can be shifted. This can suppress entangling or the like of the first optical fibers, which facilitates a specific operation or the like regarding the optical fiber in the first optical fiber housing part.

The above optical fiber rack may further comprise a plurality of dividing members arranged in the vertical direction in the first optical fiber housing part, in which each of the plurality of dividing member may be continuously provided at a leading end of the first guide part of the optical fiber guide corresponding the dividing member on the side of the first optical fiber housing part. In this case, the positions of the first optical fibers from the optical fiber guide toward the first optical fiber housing part can be shifted by each dividing member with high accuracy. Note that the optical fiber rack according to an embodiment of the invention may be that obtained by adequately combining matters described in the embodiment according to the present application invention.

Details of Embodiments According to the Present Application Invention

Hereinafter, a description is given in detail of preferred embodiments of the invention with reference to the attached drawings. In the following description, the same components or components having the same function are designated by the same reference sign, and a duplicated description is omitted.

Figure 2:
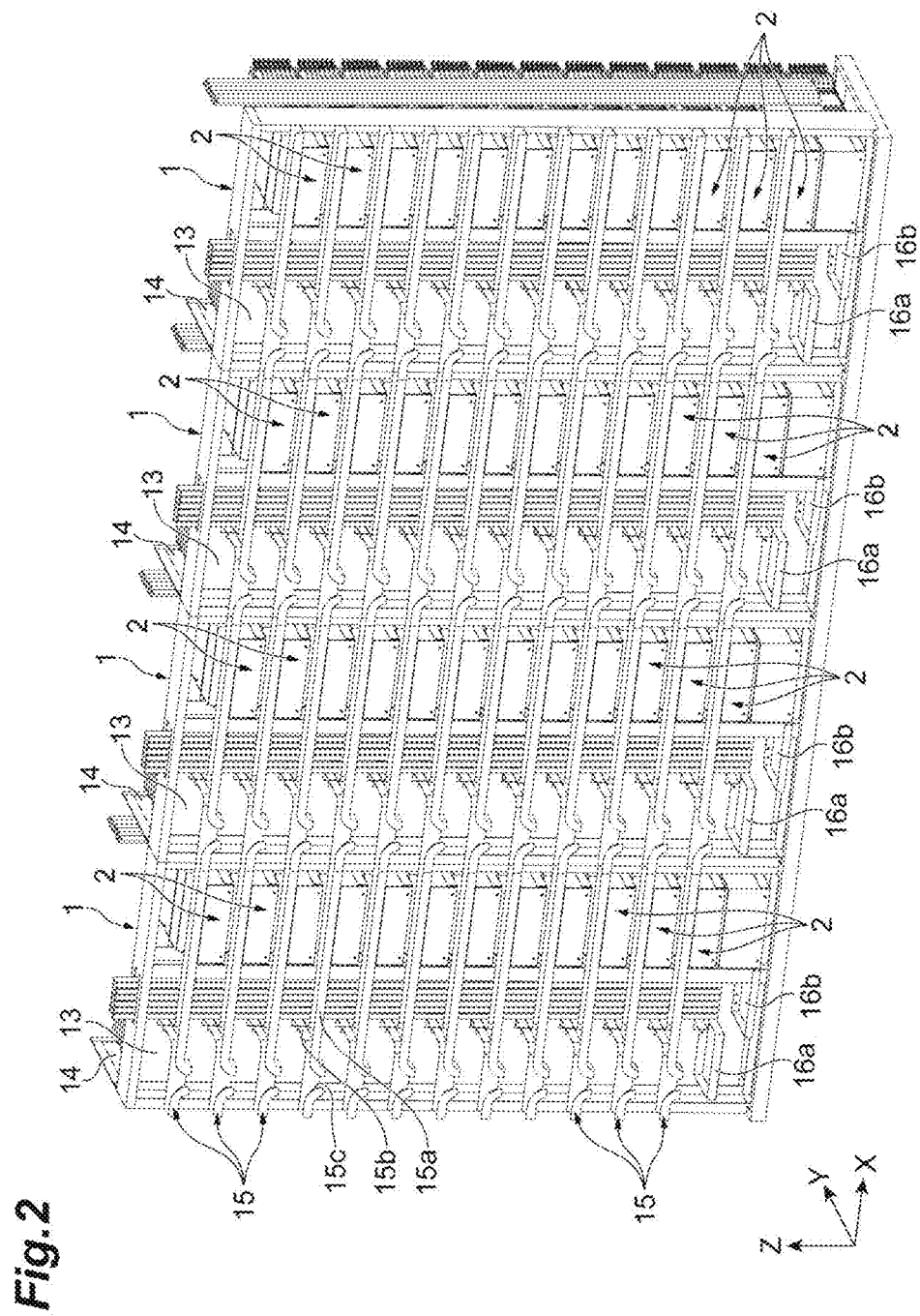
FIG. 2 is a diagram of the diagram of FIG. 1 seen from a back side.
Figure 3:
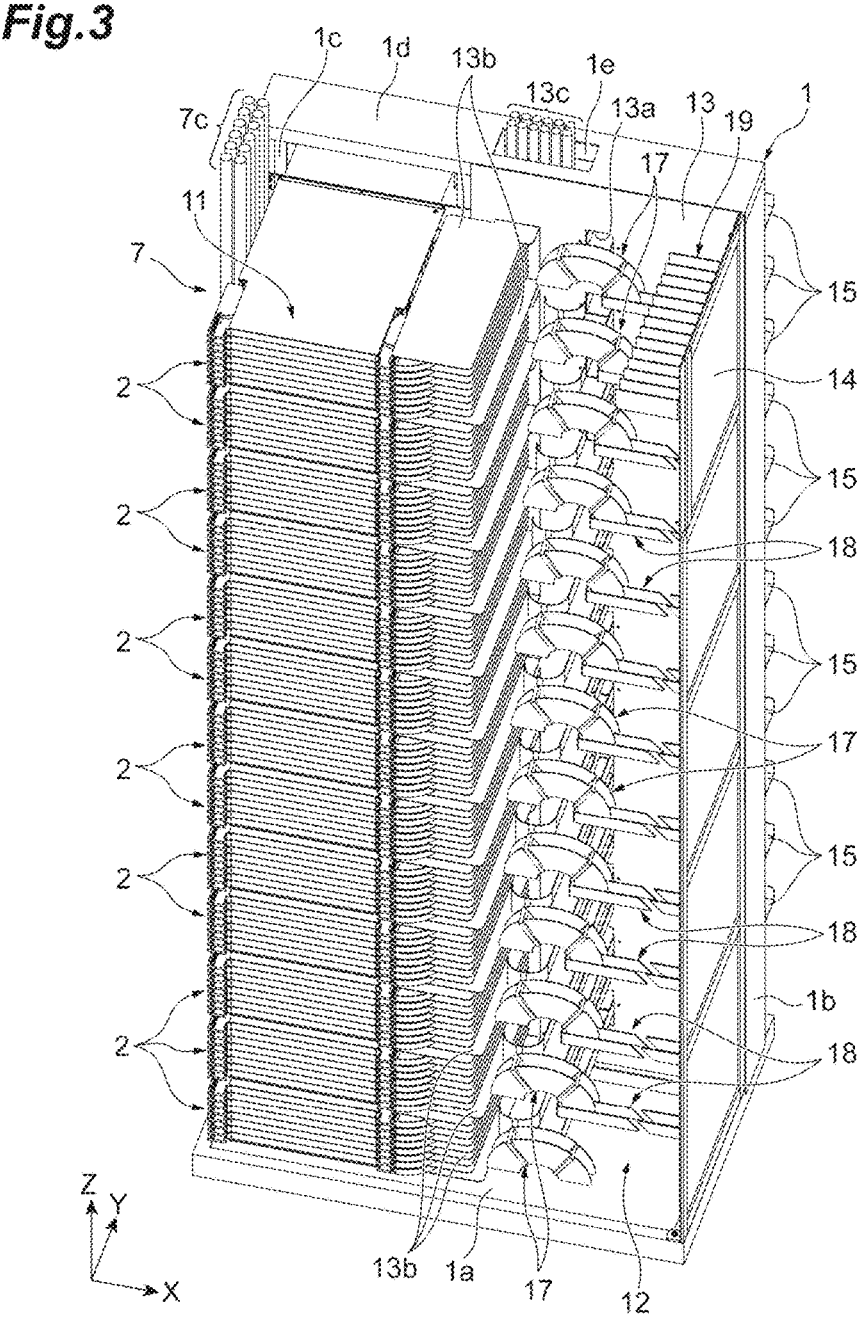
FIG. 3 is a schematic perspective view illustrating the optical fiber rack according to the embodiment.
Figure 4:
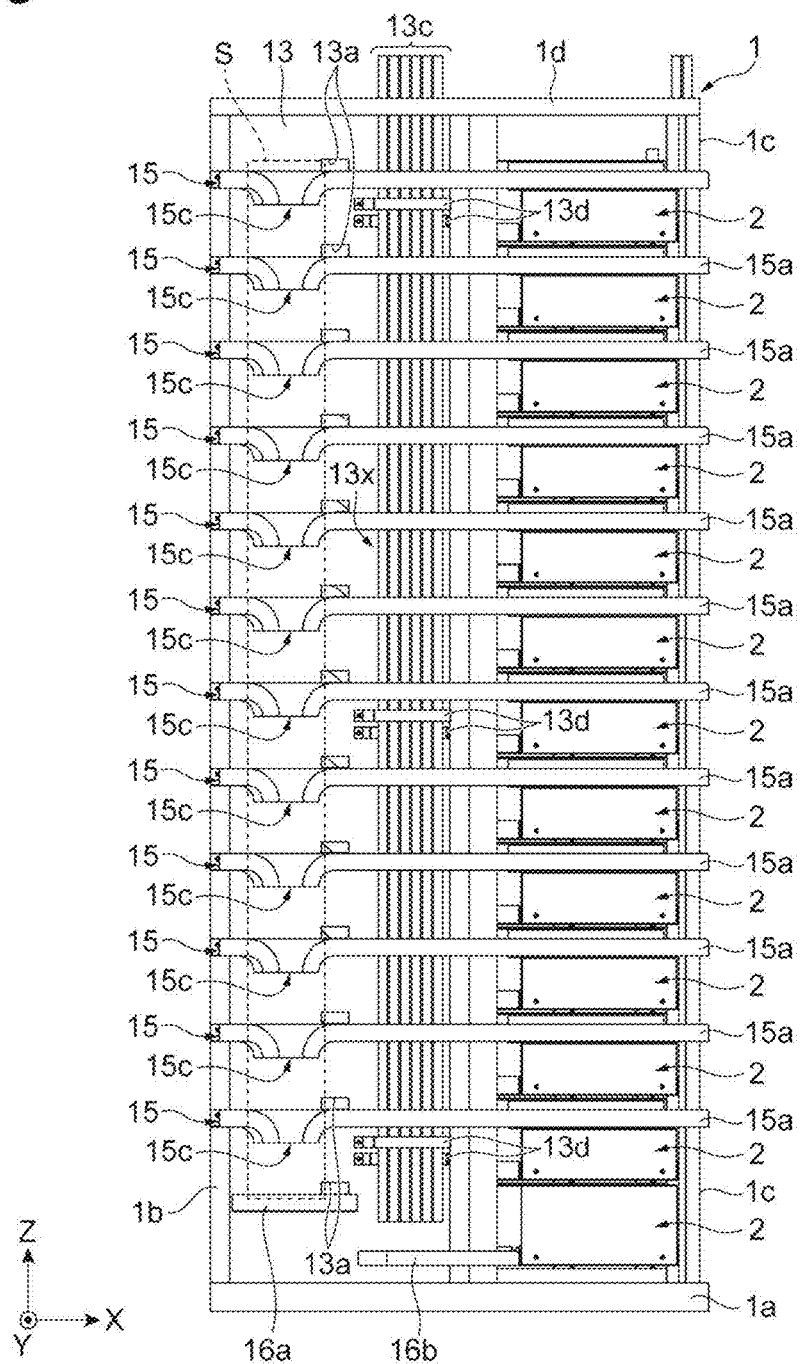
FIG. 4 is a back side view of the optical fiber rack according to the embodiment.

FIG. 1 is a diagram illustrating a state where optical fiber racks according to the embodiment are arranged in one direction and FIG. 2 is a diagram of the diagram of FIG. 1 seen from a back side. FIG. 3 is a schematic perspective view illustrating the optical fiber rack according to the embodiment, and FIG. 4 is a back side view of the optical fiber rack according to the embodiment. In FIG. 1 to FIG. 4, all optical fiber cables (optical fibers) are omitted. Hereinafter, a direction in which a plurality of optical fiber racks 1 are arranged is a direction X (a right-left direction), a direction perpendicular to the direction X in a horizontal direction is a direction Y (a front-rear direction), and a direction perpendicular to the direction X and direction Y is a direction Z (vertical direction).

The optical fiber rack 1 illustrated in FIG. 1 to FIG. 4 is an apparatus used when terminating the optical fiber cable at a data center or the like, and is called an FDF (Fiber Distributing Frame), for example. In the optical fiber rack 1, a termination unit 2 (described later in detail) is located, which retains a multicore optical fiber, and houses a connection point. In the optical fiber rack 1, the multicore cable optically linked to the termination unit 2 is divided into a plurality of optical fibers and subjected to line-arrangement. The multicore cable is an optical fiber having several tens to several hundreds of core wires. In the embodiment, the multicore cable has 288 core wires.

Next, a description is given of a specific configuration of the optical fiber rack 1. The optical fiber rack 1 is composed of a bottom frame part 1a as a pedestal, a pair of vertical frame parts 1b and 1c extending from the bottom frame part 1a in the direction Z, and a top frame part 1d provided on top faces of the vertical frames parts 1b and 1c, and has a frame like shape. The optical fiber rack 1 includes a rack part 11, an optical fiber housing part 12 (a first optical fiber housing part), a partition plate 13, a lateral plate 14, a plurality of rails 15, trays 16a and 16b, a plurality of optical fiber guides 17, a plurality of first dividing members 18, and a second dividing member 19.

The rack part 11 is a part on which a plurality of termination unit 2 arranged in the direction Z are located. In the rack part 11, a plurality of shelf plates, not illustrated in the figure, are provided in the vertical direction, for example, and the termination unit 2 is located on each shelf plate.

Figure 5A:
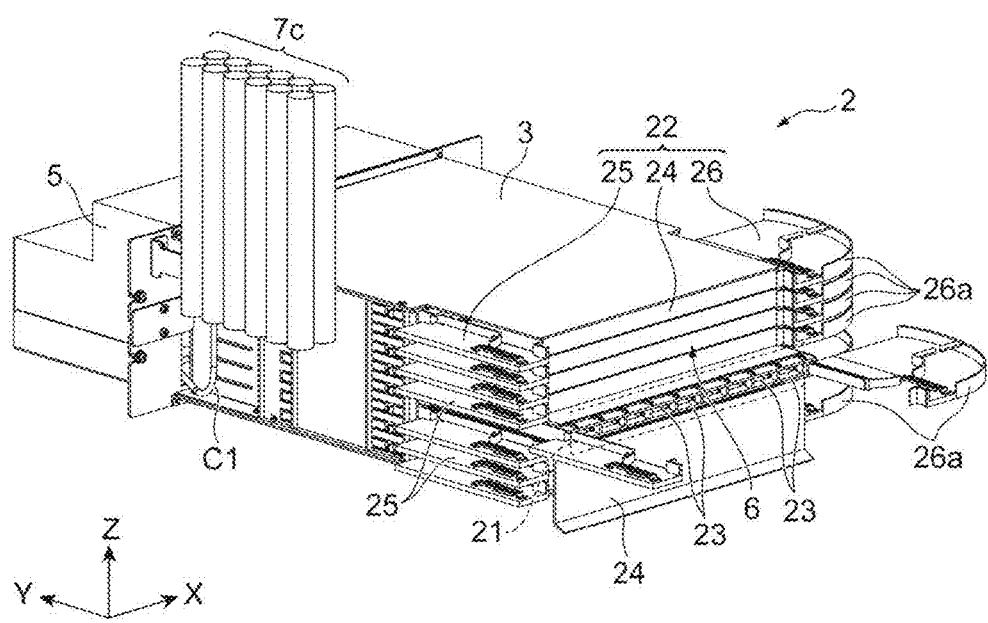
FIG. 5A is a front side perspective view of a termination unit.
Figure 5B:
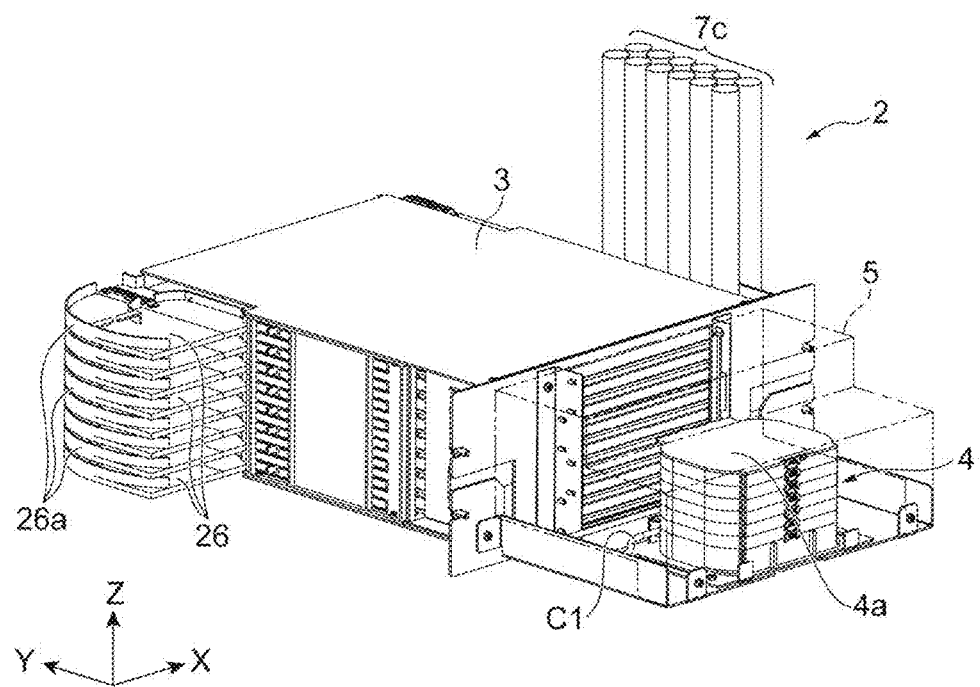
FIG. 5B is a back side perspective view of the termination unit.

Here, a description is given of functions and configuration of the termination unit 2 with reference to FIG. 5A to FIG. 7. FIG. 5A is a front side perspective view of the termination unit 2, FIG. 5B is a back side perspective view of the termination unit 2, and FIG. 6 is a diagram illustrating a part of an inner side of the termination unit 2. FIG. 7 is a diagram illustrating the termination unit 2 located at a lowermost side in a rack part 11. As illustrated in FIG. 5A, FIG. 5B, and FIG. 6, the termination unit 2 includes a main body part 3 formed into substantially a rectangular parallelepiped shape, a first external connection part 4 provided on a rear side of the main body part 3, a lid part 5 covering the first external connection part 4, a second external connection part 6 provided at a front end of the main body part 3, and coated optical fibers 8 with connector (fusion optical fibers) provided within the main body part 3.

The first external connection part 4 is a part where the multicore cable extending from a fusion rack or the like, for example, is introduced, and the multicore cable is optically linked to the termination unit 2. The first external connection part 4 is provided on the rear side of the main body part 3, has a fusion tray 4a housing portions at which the optical fibers are fused to each other. In the fusion tray 4a, any one of a coated optical fiber C1 of a multicore cable 7c housed in a cable housing part 7 and a coated optical fiber C2 of a multicore cable not housed in the cable housing part 7 (hereinafter, referred to as a local fusion cable) and one end of the coated optical fiber 8 with connector are optically linked by fusion. In the embodiment, the coated optical fiber C1 as an input optical fiber is introduced into the first external connection part 4 in the termination unit 2 other than the lowermost termination unit 2. On the other hand, a coated optical fiber C2 of a local fusion cable 13c as an input optical fiber is introduced into the first external connection part 4 in the lowermost termination unit 2, as illustrated in FIG. 7. The fusion may be conducted after the termination unit 2 is located on the rack part 11, or before the termination unit 2 is located on the rack part 11. In the embodiment, in the lowermost termination unit 2, the fusion is conducted after the termination unit 2 is located on the rack part 11.

The lid part 5 is a lid covering the first external connection part 4. The lid part 5 is detachably attached to the main body part 3.

The second external connection part 6 is a part for optically linking the other end of the coated optical fiber 8 with connector to a bundle of optical fibers C3 (first optical fibers) (hereinafter, referred to as an optical fiber bundle Wb) connected with an external device or the like (e.g., a server), for example. The second external connection part 6 includes a plurality of adapter groups 21 stacked on each other, and a plurality of covers 22 dividing and protecting the respective adapter groups 21. Each adapter group 21 includes a plurality of adapters 23 for optically linking the coated optical fibers 8 with connector to the optical fibers C3. A plurality of adapters 23 included in each adapter group 21 are aligned in the direction X. Each cover 22 is positioned below the corresponding adapter group 21 and is formed into one body with the adapter group 21. Each cover 22 is provided to be extractable in the front-rear direction. Therefore, in conjunction with the cover 22 being extracted, the corresponding adapter group 21 is extracted. The cover 22 includes a cover part 24 protecting outside connection ends of the adapters 23 and support parts 25 and 26 supporting the cover part 24. The cover part 24 is caught together and supported by the support parts 25 and 26. A rear edge of the cover part 24 is pivotable about an axis extending in the direction X. For this reason, the cover part 24 can be downward pivoted by extracting the cover part 24 and releasing a catching state of the support parts 25 and 26 for the cover part 24. This allows the cover part 24 positioned around the outside connection end of the extracted adapter 23 to be moved, which facilitates connection of the optical fiber C3 to the connection end. The support part 26 provided on another lateral side of the main body part 3 is provided with a guide 26a guiding the optical fiber bundle Wb in a predetermined direction.

The second external connection part 6 may be optically linked to an optical fiber (a second optical fiber) other than the optical fiber C3 that is the first optical fiber. For example, as the second optical fiber, the optical fiber (hereinafter, also referred to as a cross-connect optical fiber) may be optically linked for connecting the termination units 2 different from each other. A combination of the termination units 2 different from each other may be a combination of the different termination units 2 located in one optical fiber rack 1, or a combination of the termination unit 2 located in an optical fiber rack 1 and the termination unit 2 located in another optical fiber rack 1.

The cable housing part 7 is an area in which the multicore cable 7c is housed, and positioned on a lateral side of the main body part 3 on the same or opposite side of the support part 26. As illustrated in FIG. 3, in view of improving workability of wiring the optical fiber bundle Wb in the optical fiber housing part 12, the multicore cable 7c may be arranged on the opposite side of the optical fiber housing part 12 with respect to the rack part 11.

The coated optical fiber 8 with connector is a cluster of single core optical fiber cables. One end of the coated optical fiber 8 with connector is bundled and is housed in the fusion tray 4a, and is a part fused to the multicore cable, as described above. The other end of the coated optical fiber 8 with connector is provided with a connecter, which is connected with the adapter 23.

Figure 8:
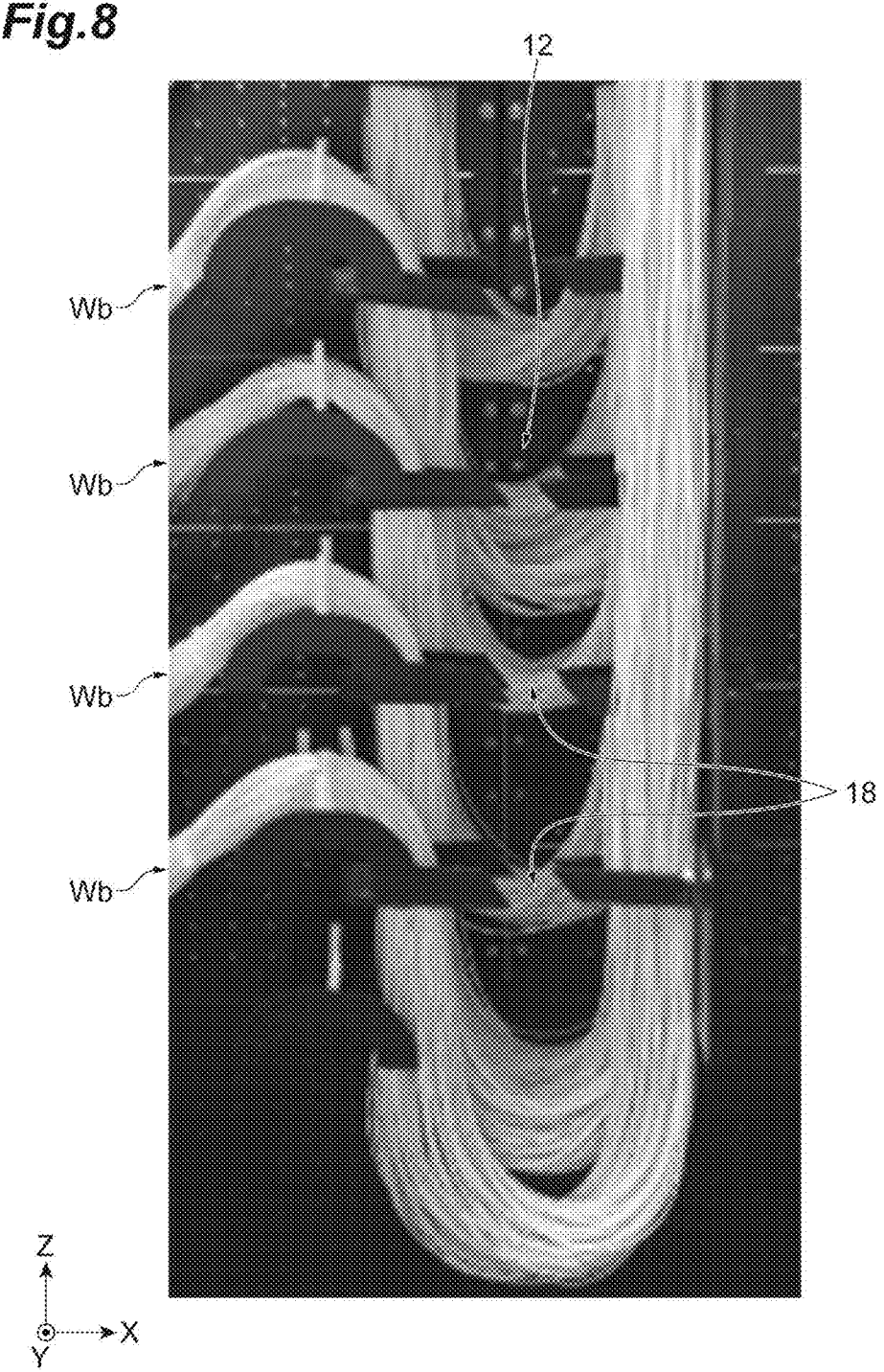
FIG. 8 is a photograph showing a state where an extra length wiring part of an optical fiber bundle is housed in an optical fiber housing part.

Returning back to FIG. 1 to FIG. 4, the optical fiber housing part 12 is provided next to the rack part 11 in the direction X, and is a part in which the extra length wiring part of the optical fiber bundle Wb connected with the termination unit 2 (see FIG. 6) is housed. In the optical fiber housing part 12, a plurality of optical fiber bundles Wb are respectively divided by a plurality of the first dividing members 18 and a second dividing member 19. FIG. 8 is a photograph showing a state where the extra length wiring part of the optical fiber bundle Wb is housed in the optical fiber housing part 12. As illustrated in FIG. 8, the extra length wiring part of the optical fiber bundle Wb is housed in a state of sagging as in a U-shape, for example.

The partition plate 13 is a plate-like member partitioning between the optical fiber housing part 12 and a housing part S described later in the direction Y. The partition plate 13 extends in the direction X and direction Z, and serves as a rear plate of the optical fiber housing part 12. The partition plate 13 is fixed by the bottom frame part 1a, the vertical frame part 1b, and the top frame part 1d, for example. The partition plate 13 is provided with a plurality of openings 13a, a plurality of thin plates 13b, and a cable housing part 13x.

A plurality of opening 13a are provided to lay the optical fibers from a front face side of the partition plate 13 toward a back face side thereof, or lay the optical fibers from the back face side of the partition plate 13 toward the front face side thereof, for example. A plurality of openings 13a are provided to align in the direction Z. Each of a plurality of thin plates 13b is a plate-like member supporting the optical fiber bundle Wb connected with each adapter 23 of the termination unit 2, and is attached to a surface of the partition plate 13. Each thin plate 13b is provided closer to the rack part 11 than the opening 13a. On each thin plate 13b, the support part 26 of the cover 22 of the corresponding termination unit 2 is located. In view of preventing the optical fiber bundle Wb from inhibiting the cover 22 being extracted, the extra length wiring part of the optical fiber bundle Wb may be provided on the thin plate 13b. The cable housing part 13x is an area housing the local fusion cable 13c, and the local fusion cable 13c is attached via a fixing member 13d to the back side of the partition plate 13, for example. The cable housing part 13x extends in the direction Z. The cable housing part 13x extends in the direction Z from near the bottom frame part 1a through an opening 1e provided in the top frame part 1d to exceed the top frame part 1d, for example.

The lateral plate 14 is a plate-like member dividing the optical fiber racks 1 in the direction X. The lateral plate 14 extends in the direction Y and direction Z. The lateral plate 14 is positioned on the opposite side of the rack part 11 with respect to the optical fiber housing part 12, and is fixed to the bottom frame part 1a and the vertical frame part 1b or the partition plate 13.

Each of a plurality of rails 15 is a member guiding the optical fibers laid on the back side of the partition plate 13. Each of a plurality of rails 15 is positioned on the opposite side of the optical fiber housing part 12 with respect to the partition plate 13 (on the back side of the partition plate 13), and is provided apart from the partition plate 13 in the direction Y. Each of a plurality of rails 15 is formed into a substantially U-shaped groove shape extending in the direction X. One end of each rail 15 is attached to a back face of the vertical frame part 1b, and the other end of each rail 15 is attached to a back face of the vertical frame part 1c. Therefore, each rail 15 is provided not only to the back side of the partition plate 13 but also to the back side of the rack part 11. In addition, one and the other ends of the rail 15 described above have shapes capable of being coupled with each other. For this reason, in the case that the optical fiber racks 1 are arranged in the direction X, the rails 15 of the optical fiber racks 1 next to each other can be coupled with each other.

The rail 15 is provided apart from not only the partition plate 13 but also the cable housing part 13x in the direction Y. Therefore, the local fusion cable 13c arranged in the cable housing part 13x is provided between the partition plate 13 and the rail 15 in the direction Y. Therefore, the contact between the optical fibers laid on the rail 15 and the local fusion cable 13c arranged in the cable housing part 13x can be preferably suppressed.

The rail 15 includes a main part 15a extending in the direction X, a branch part 15b branching and extending from the main part 15a, and a disconnect part 15c where a part of the main part 15a is disconnected. The branch part 15b is a part extending from the main part 15a toward the corresponding opening 13a in the direction Y. The disconnect parts 15c are provided on the back side of the optical fiber housing part 12 with respect to the partition plate 13 to align in the direction Z. A part of the main part 15a forming the disconnect part 15c is curved toward the bottom frame part 1a. The disconnect part 15c like this is formed to allow the optical fibers positioned on the back side of the partition plate 13 to be laid on a plurality of rails, and the extra length wiring parts of the optical fibers to be provided. In other words, on the rear side of the optical fiber housing part 12 with respect to the partition plate 13, the housing part S (a second optical fiber housing part) is provided in which the extra length wiring part of the optical fiber different from the optical fiber C3 in the optical fiber bundle Wb (e.g., the second optical fiber such as the cross-connect optical fiber) is housed.

The trays 16a and 16b are members on which the extra length wiring part of the optical fiber positioned on the back side of the partition plate 13 is put on, and are attached to the back face of the partition plate 13. The tray 16a is provided between the disconnect part 15c of the rail 15 located at the lowermost side in the direction Z and the bottom frame part 1a. For this reason, the extra length wiring part of the optical fiber provided on the disconnect part 15c can be located on the tray 16a. The tray 16b is provided between a lower end of the cable housing part 13x and the bottom frame part 1a in the direction Z. Therefore, the extra length wiring part of the coated optical fibers C2 of the local fusion cable 13c extending from the cable housing part 13x to the termination unit 2 can be located on the tray 16b.

Figure 9:
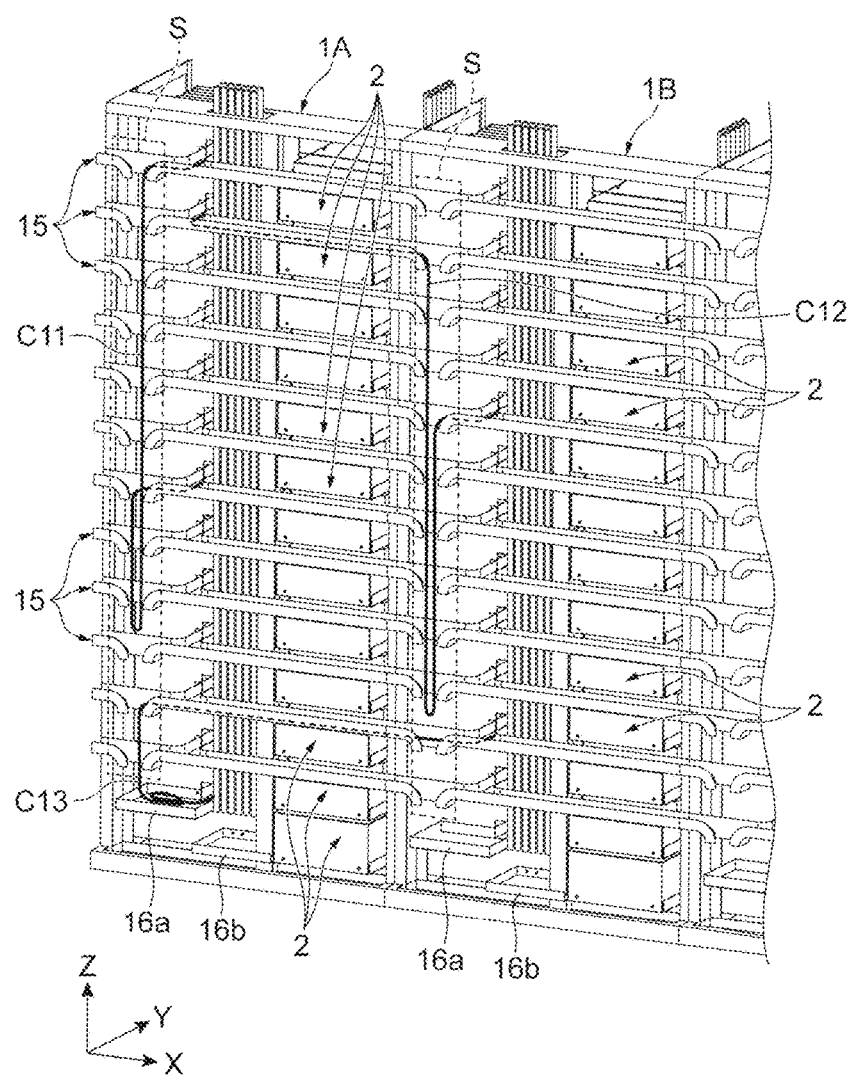
FIG. 9 is a diagram illustrating an example in which cross-connect optical fibers are laid.

FIG. 9 is a diagram illustrating an example in which the cross-connect optical fibers are laid. Assume, in the optical fiber rack 1 illustrated in FIG. 9, that a rack at the endmost side in the direction X is an optical fiber rack 1A, and a rack next to the optical fiber rack 1A is an optical fiber rack 1B. FIG. 9 illustrates cross-connect optical fibers C11 to C13 laid on the rails 15. The cross-connect optical fiber C11 optically links the different termination units 2 on the optical fiber rack 1A to each other. Specifically, the cross-connect optical fiber C11 optically links the second external connection part 6 of the termination unit 2 located on an uppermost side of the optical fiber rack 1A to the second external connection part 6 of the termination unit 2 the sixth from the top of the optical fiber rack 1A. An extra length wiring part of the cross-connect optical fiber C11 is provided in the housing part S of the optical fiber rack 1A. The cross-connect optical fibers C12 and C13 optically link the termination unit 2 located on the optical fiber rack 1A to the termination unit 2 located on the optical fiber rack 1B. Specifically, the cross-connect optical fiber C12 optically links the termination unit 2 the second from the top of the optical fiber rack 1A to the termination unit 2 the fourth from the top of the optical fiber rack 1B. On the other hand, the cross-connect optical fiber C13 optically links the termination unit 2 the second from the bottom of the optical fiber rack 1A to the termination unit 2 the fourth from the bottom of the optical fiber rack 1B. An extra length wiring part of the cross-connect optical fiber C12 is provided in the housing part S of the optical fiber rack 1B. An extra length wiring part of the cross-connect optical fiber C13 is put on the tray 16a of the optical fiber rack 1A.

In the case that the cross-connect optical fibers C11 to C13 are laid as illustrated in FIG. 9, the extra length wiring part of the optical fiber bundle Wb, the extra length wiring parts of the cross-connect optical fibers C11 to C13, the multicore cable 7c housed in the cable housing part 7, and the local fusion cable 13c housed in the cable housing part 13x are arranged to be not in contact with each other.

Figure 11:
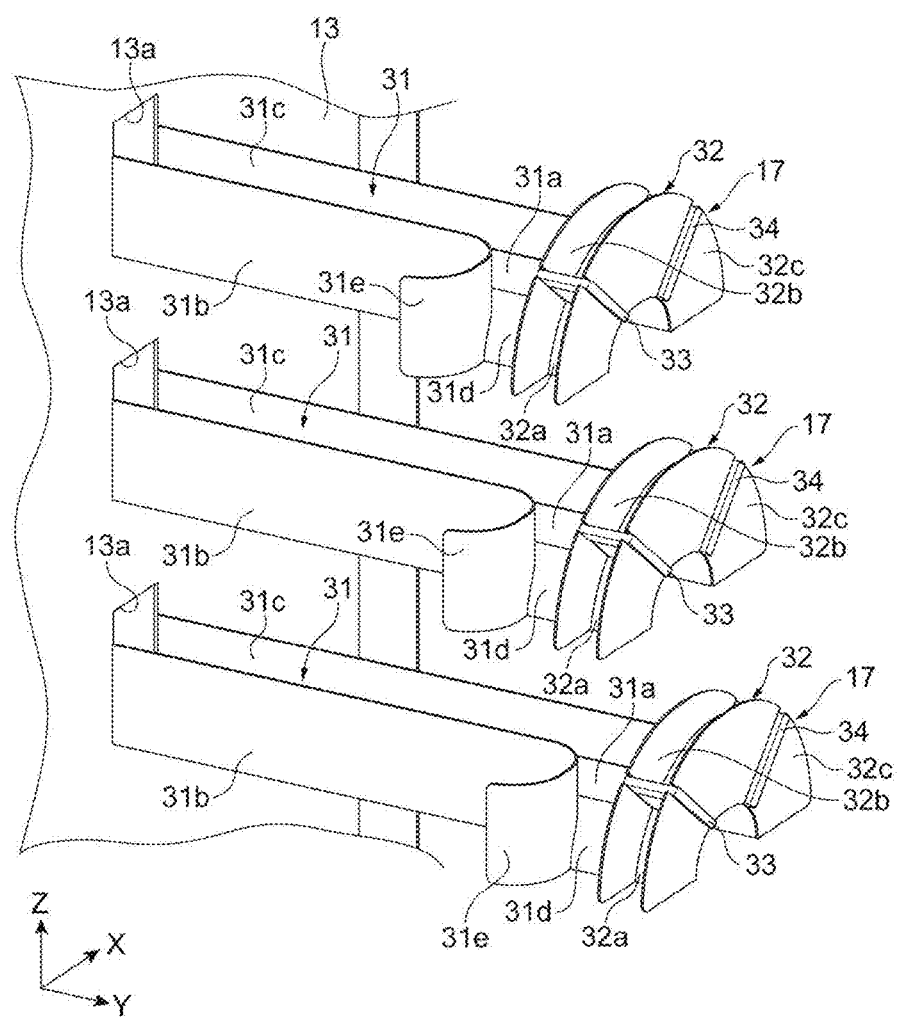
FIG. 11 is a diagram enlargedly illustrating a part of the optical fiber guides.

Returning back to FIG. 1 to FIG. 4, each of a plurality of optical fiber guides 17 is a member guiding the optical fiber connected with the second external connection part 6 of the termination unit 2, and attached to the surface of the partition plate 13 on the optical fiber housing part 12 side. The optical fiber guides 17 are arranged in the direction Z to respectively correspond to the termination units 2. Here, a description is given of the configuration of the optical fiber guide 17 with reference to FIG. 10 and FIG. 11. FIG. 10 is an enlarged perspective view of the optical fiber guide, and FIG. 11 is a diagram enlargedly illustrating a part of the optical fiber guides. As illustrated in FIG. 10 and FIG. 11, the optical fiber guide 17 includes a guide part 31 (a second guide part) housing the optical fiber passing through the opening 13a of the partition plate 13 (e.g., the cross-connect optical fiber that is the second optical fiber), a guide part 32 (a first guide part) housing the optical fiber C3 toward the optical fiber housing part 12 (e.g., the optical fiber bundle Wb), and a restriction part 33 restricting a motion of the optical fiber C3 in the direction Z.

The guide part 31 is a part attached to the surface of the partition plate 13 on the optical fiber housing part 12 side. To be more specific, the guide parts 31 are respective parts attached to the surface of the partition plate 13 adjacent to the corresponding opening 13a. The guide part 31 has a substantially U-shaped groove shape protruding from the partition plate 13. In the embodiment, the guide part 31 has a substantially U-shaped groove shape extending in the direction Y. The guide part 31 has a bottom part 31a, a sidewall part 31b on the rack part 11 side, and a sidewall part 31c on the optical fiber housing part 12 side. At least a part of the sidewall part 31b of the guide part 31 is cut off. A slope part 31d is provided which extends on the rack part 11 side in the direction X from the bottom part 31a of the guide part 31 not provided with sidewall part 31b. The slope part 31d is curved downward from the bottom part 31a toward the rack part 11 in the direction X. A forward end of the sidewall part 31b is provided with a curved plate 31e restricting a position of the optical fiber, the curved plate 31e being curved to guide the second optical fiber toward the guide part 31. The curved plate 31e is a plate-like member curved toward the front side as seen from the direction Z. A curvature radius of the curved plate 31e seen in the direction Z is larger than an allowable bending radius of the optical fiber guided by the guide part 31, for example. In this case, a part of the optical fiber in contact with curved plate 31e can be prevented from bending to exceed the allowable bending radius to be broken.

Protruding amounts of the respective guide parts 31 are not uniform and vary. Specifically, the protruding amount of the guide part 31 is larger at the optical fiber guide 17 provided lower in the direction Z. In other words, a dimension of the guide part 31 in the direction Y of the optical fiber guide 17 provided lower in the direction Z is larger. For example, the dimensions of the guide parts 31 in the direction Y are adjusted so that the guide parts 32 do not overlap each other in the direction Z.

The guide part 32 is a part provided at a leading end of the guide part 31, and has a substantially U-shaped groove shape. The guide part 32 extends in a direction crossing a protruding direction of the guide part 31. In the embodiment, the guide part 32 extends in the direction X. The guide part 32 has a bottom part 32a, a sidewall part 32b (wall part) on the guide part 31 side, and a sidewall part 32c on the opposite side of the sidewall part 32b with respect to the bottom part 32a. The bottom part 32a is curved upward seen in the direction Y. A curvature radius of the bottom part 32a seen in the direction Y is larger than the allowable bending radius of the optical fiber C3 in the optical fiber bundle Wb, for example. The sidewall part 32b is provided to divide between the guide part 31 and the guide part 32. Specifically, the sidewall part 32b is provided to divide not only between the bottom parts 31a and 32a but also between the slope part 31d and the bottom part 32a. The sidewall parts 32b and 32c are provided along a shape of the bottom part 32a, and have substantially the same shape. The sidewall part 32b is provided with a slit 32d on the rack part 11 side thereof; and the sidewall part 32c is provided with a slit 32e on the optical fiber housing part 12 side thereof. Similarly, the sidewall part 32c is provided with a slit 32f on the rack part 11 side thereof, and the sidewall part 32c is provided with a slit 32g on the optical fiber housing part 12 side thereof. The slits 32d and 32f are provided to face each other in the direction Y, and the slits 32e and 32g are provided to face each other in the direction Y.

Each of the restriction parts 33 and 34 is a member restricting a motion of the optical fiber bundle Wb housed in the guide part 32 in the direction Z. The restriction part 33 is provided to be housed in the slits 32d and 32f, and has a substantially rectangular frame shape. The restriction part 33 includes a main body part 33a substantially U-shaped, and a bar-like member 33b attached to an upper end of the main body part 33a. The main body part 33a is housed in the slits 32d and 32f to be substantially U-shaped seen in the direction X. One end of the bar-like member 33b is pivotably attached to one upper end of the main body part 33a, and the other end of the bar-like member 33b is caught together the other upper end of the main body part 33a. For example, the other end of the bar-like member 33b is inserted into a groove provided in the other upper end of the main body part 33a such that the restriction part 33 defines a frame shape. The restriction part 33 may have means for being fixed to the guide part 32 (e.g., a claw part or the like). The restriction part 34 has the same functions and shape as the restriction part 33, and is housed in the slits 32e and 32g. Therefore, the restriction part 34 includes a main body part 34a substantially U-shaped, and a bar-like member 34b attached to an upper end of the main body part 34a. The motion of the optical fiber bundle Wb in the direction Z is restricted such that the optical fiber bundle Wb is to be laid in the direction X and direction Y, and as a result, the motion of the optical fiber bundle Wb in a direction along the guide part 32 is restricted.

Here, a description is given of an example of a method of using the restriction part 33. First, the main body part 33a of the restriction part 33 is housed in the slits 32d and 32f. Next, the optical fiber bundle Wb is housed on the bottom part of the main body part 33a. At this time, the catching state of the other end of the bar-like member 33b for the main body part 33a is released to allow the optical fiber bundle Wb to be easily housed in the main body part 33a. Next, the bar-like member 33b is caught together the main body part 33a. This allows the optical fiber bundle Wb to be housed in a space defined by the restriction part 33 to be able to restrict the motion of the optical fiber bundle Wb in the direction Z. The restriction part 34 may be used by the same method as the restriction part 33.

The number of restriction parts may be one or may be at least two. In a case that the optical fiber is added to or reduced from the optical fiber bundle Wb, the optical fiber bundle Wb may be held to prevent an unexpected stress from being applied which is caused by the optical fiber bundle Wb already housed moving by its own weight when releasing the restriction part. In such a case, if there are at least two restriction parts, even if one restriction part is released unless the other is released, the optical fiber bundle Wb can be continuously held. For example, in the case that there are two restriction parts, after one restriction part is uncoupled to uncouple a part of the optical fibers from one restriction part, the one restriction part is caught together to hold the optical fiber bundle Wb, and then, the other restriction part is uncoupled to uncouple the part of the optical fibers from the other restriction part, so that the part of the optical fibers can be separated from the optical fiber bundle Wb. On the other hand, the optical fiber bundle Wb except for the optical fiber to be separated continuously keeps a state of being caught together to prevent an unexpected stress from applying. When adding the optical fiber, in a reverse procedure to the above, after one restriction part is uncoupled to catch together the optical fiber bundle Wb including the optical fiber be added by one restriction part, the other restriction part may be released from the caught state to catch together the optical fiber bundle Wb including the optical fiber to be added by the other restriction part.

Figure 12:
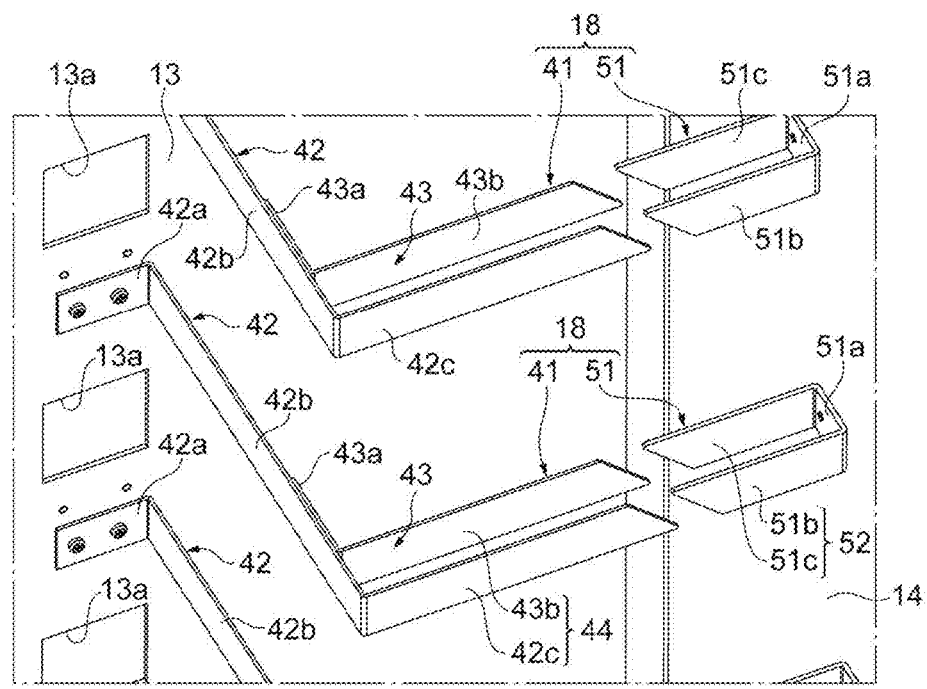
FIG. 12 is a diagram enlargedly illustrating a part of a first dividing members.
Figure 13:
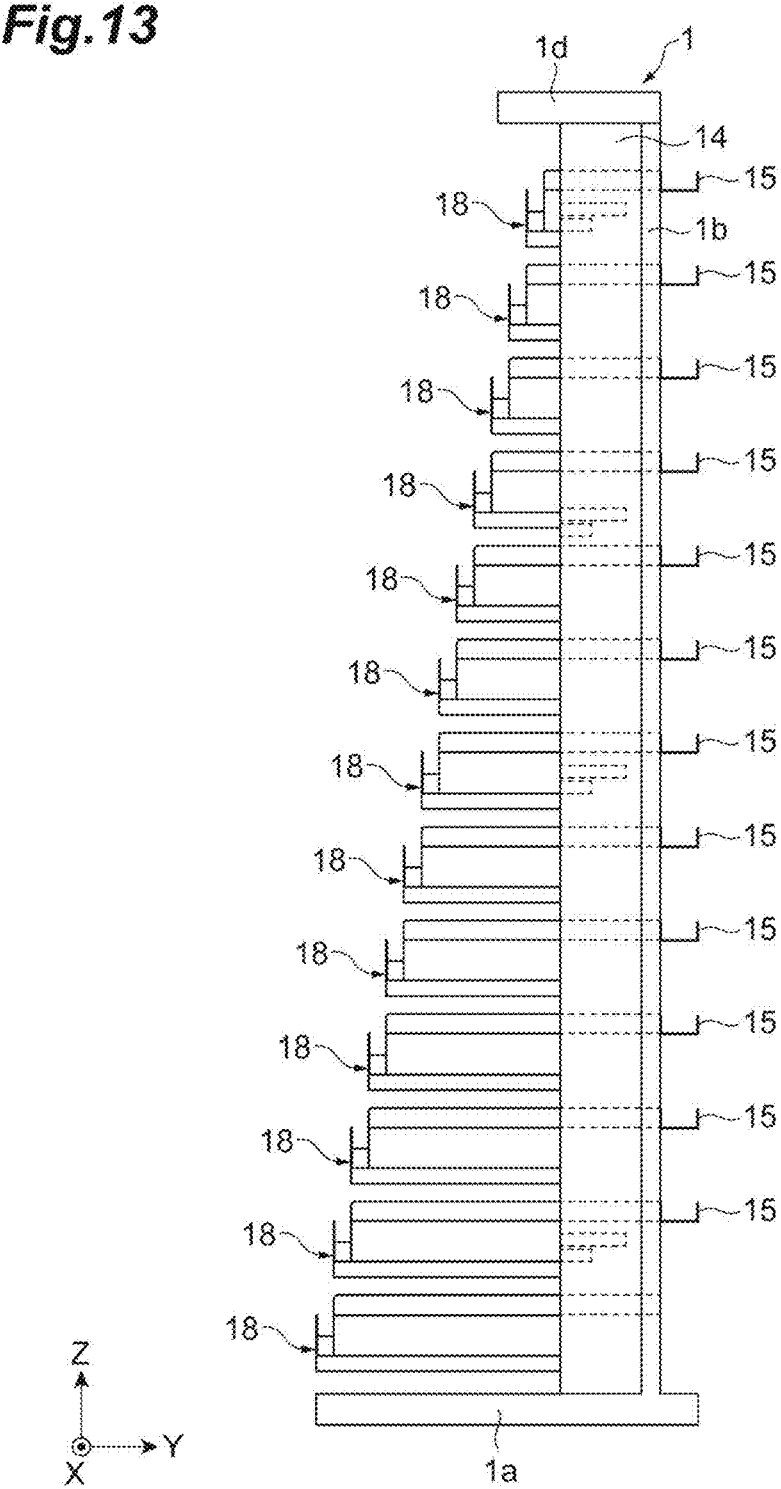
FIG. 13 is a schematic diagram of the optical fiber housing part seen from a lateral plate side in a direction Y.

FIG. 12 is a diagram enlargedly illustrating a part of the first dividing members. FIG. 13 is a schematic diagram of the optical fiber housing part 12 seen from the lateral plate 14 side in the direction Y. As illustrated in FIG. 8 also, the first dividing member 18 illustrated in FIG. 12 is a member dividing the positions of the optical fiber bundle Wb in the optical fiber housing part 12. A plurality of the first dividing members 18 are provided to be arranged in the direction Z in the optical fiber housing part 12 to respectively correspond to the optical fiber guides 17. As illustrated in FIG. 13, the first dividing member 18 provided lower in the direction Z is positioned farther from the partition plate 13. Each first dividing member 18 includes a first dividing body 41 attached to the surface of the partition plate 13, and a second dividing body 51 attached to the lateral plate 14.

The first dividing body 41 is a part for dividing a part introduced from the optical fiber guide 17 to the optical fiber housing part 12 of the optical fiber bundle Wb to be housed in the optical fiber housing part 12. The first dividing body 41 is composed of a first bar-like member 42 and a second bar-like member 43, for example. The first bar-like member 42 includes a flange part 42a fixed to the surface of the partition plate 13 via a fixing member such as a screw, a middle part 42b extending in the direction Y from an end of the flange part 42a on the lateral plate 14 side in the direction X, and a dividing bar 42c crossing the direction Y from a forward end of the middle part 42b and extending toward the lateral plate 14. The flange part 42a, the middle part 42b, and the dividing bar 42c are provided by bending a member having a bar-like shape, for example. The flange part 42a is fixed below the corresponding optical fiber guide 17. A dimension of the middle part 42b in direction Y provided lower in the direction Z is larger. Therefore, the dividing bar 42c provided lower in the direction Z is positioned farther from the partition plate 13 in the direction Y. In the embodiment, the dividing bar 42c extends in the direction X.

The second bar-like member 43 includes a flange part 43a attached to the middle part 42b, and a dividing bar 43b extending from an end of the flange part 43a on the dividing bar 42c in a direction crossing the direction Y. The flange part 43a and the dividing bar 43b are provided by bending a member having a bar-like shape, for example. The flange part 43a is attached to a surface of the middle part 42b facing the lateral plate 14 by an adhesive or the like, for example. The dividing bar 43b is positioned closer to the partition plate 13 in the direction Y than the dividing bar 42c, and apart from the dividing bar 42c in the direction Y. An apart distance between the dividing bar 43b and the dividing bar 42c of the first dividing body 41 in the direction Y is substantially constant. Therefore, the dividing bar 43b provided lower in the direction Z is positioned farther from the partition plate 13 in the direction Y.

Each first dividing body 41 has a holding part 44 which is constituted by a pair of dividing bars 42c and 43b separated from each other and holds the optical fiber bundle Wb. The holding part 44 provided lower in the direction Z is positioned farther from the partition plate 13 in the direction Y. The respective holding parts 44 may not overlap each other in the direction Z. The holding part 44 is continuously provided at a leading end of the guide part 32 of the corresponding optical fiber guide 17 on the optical fiber housing part 12 side. To be more specific, as illustrated in FIG. 10, the dividing bar 42c is in contact and contiguous with a leading end of the sidewall part 32c on the optical fiber housing part 12 side, and the dividing bar 43b is in contact and contiguous with a leading end of the sidewall part 32b on the optical fiber housing part 12 side. This forms the guide part 32 and the holding part 44 into one body, and therefore, the optical fiber bundle Wb guided by the guide part 32 is easily divided by the first dividing body 41 in the optical fiber housing part 12.

The second dividing body 51 is a part for dividing the optical fiber bundle Wb to be housed in the optical fiber housing part 12, and provided to face with and be apart from the first dividing body 41 in the direction X. The second dividing body 51 is provided by bending a member having a bar-like shape into substantially a U-shape, for example. The second dividing body 51 includes a base part 51a attached to the lateral plate 14, a dividing bar 51b extending from one end the base part 51a in the direction Y toward the first dividing body 41, and a dividing bar 51c extending from the other end of the base part 51a in the direction Y toward the first dividing body 41. The base part 51a is fixed to the lateral plate 14 via a screw and the like, for example. A position to which the base part 51a is fixed is adjusted due to the position of the corresponding first dividing body 41 in the direction Y.

A pair of dividing bars 51b and 51c are bar-like parts apart from each other in the direction Y, and constitute a holding part 52. The dividing bar 51b is positioned closer to a front outer side than the dividing bar 51c in the direction Y. The dividing bar 51b is provided to face with and be apart from the dividing bar 42c of the first bar-like member 42 in the direction X. The dividing bar 51c is provided to face with and be apart from the dividing bar 43b of the second bar-like member 43 in the direction X. The dividing bar 51b may be provided on an extended line of the dividing bar 42c, and the dividing bar 51c may be provided on an extended line of the dividing bar 43b.

The second dividing member 19 is a member for dividing a part extending out of the optical fiber housing part 12 of each of a plurality of optical fiber bundle Wb. The second dividing member 19 includes a plurality of plate-like fragments arranged in the direction Y to be apart from each other. The second dividing member 19 is provided near the upper end of lateral plate 14.

According to the optical fiber rack 1 of the embodiment described above, in the case that both the optical fiber bundle Wb (or, the first optical fiber) and the cross-connect optical fiber (the second optical fiber) are connected with the termination unit 2, for example, the cross-connect optical fiber and the optical fiber bundle Wb are branched from each other by the optical fiber guide 17 provided on the surface of the partition plate 13 on the optical fiber housing part 12 side. Here, the guide part 31 as the second guide part and the guide part 32 as the first guide part are partitioned from each other by the sidewall part 32b of the guide part 32 on the guide part 31 side. This can preferably prevent the cross-connect optical fiber from entering the optical fiber housing part 12 to mingle with the optical fiber bundle Wb. Therefore, the optical fiber bundle Wb and the cross-connect optical fiber used for the purposes different from each other can be easily distinguished in maintenance, for example. In addition, even if the optical fiber C3 in the optical fiber bundle Wb and the cross-connect optical fiber have the same shape, these fibers can be easily distinguished.

The optical fiber guide 17 is provided with the curved plate 31e restricting a position of the optical fiber, the curved plate 31e being curved to guide the cross-connect optical fiber as the second optical fiber. Therefore, the cross-connect optical fiber can be well guided to the guide part 31, which is unlikely to cause breakage and the like of the cross-connect optical fiber.

The optical fiber guide 17 includes the restriction part 33 restricting a motion of the optical fiber C3 housed in the guide part 32 in the direction Z. Therefore, the optical fiber C3 can be prevented from dropping out of the guide part 32, or the like. Since the optical fiber guide 17 includes the restriction part 34 in addition to the restriction part 33, the optical fiber C3 can be well prevented from dropping out of the guide part 32, or the like. Additionally, even if one restriction part is released unless the other is released, the optical fiber bundle can be continuously held.

The protruding amount of the guide part 31 is larger at the optical fiber guide 17 provided lower in the direction Z.

Therefore, in the optical fiber housing part 12, the position of each optical fiber bundle Wb in the protruding direction of the guide part 31 (i.e., position of each optical fiber bundle Wb in the direction Y) can be shifted. This can suppress entangling or the like of the optical fiber bundle Wb, which facilitates a specific operation or the like on the optical fiber in the optical fiber housing part 12.

The optical fiber rack 1 includes a plurality of the first dividing member 18 arranged in the direction Z in the optical fiber housing part 12, and the first dividing body 41 of the first dividing member 18 is continuously provided at a leading end of the guide part 32 of the corresponding optical fiber guide 17 on the optical fiber housing part 12 side. For this reason, the position in the direction Y of the optical fiber bundle Wb guided from the optical fiber guide 17 to the optical fiber housing part 12 can be shifted by the first dividing member 18 with high accuracy.

The optical fiber rack according to the invention is not limited to the above described embodiment, and other various modifications may be adopted. For example, in the above embodiment, the termination unit 2 located on the lowermost side in the rack part 11 is optically linked to the local fusion cable 13c, but the present invention is not limited thereto. As a specific example, other termination unit than the termination unit located on the lowermost side may be optically linked to the local fusion cable 13c, or the all termination units 2 may be optically linked to the corresponding coated optical fibers C1.

In the above embodiment, an example of the cross-connect optical fiber is described as the second optical fiber, but the present invention is not limited thereto. For example, a part of the optical fibers connected with the termination unit 2 and external device or the like may be the second optical fiber, and the extra length wiring part thereof may be housed in the housing part S.

In the above embodiment, each thin plate 13b is attached to the partition plate 13, but the present invention is not limited thereto. For example, each thin plate 13b may be provided on the lateral side of the main body part 3 of the termination unit 2.

In the above embodiment, the optical fiber guide 17 is provided with the curved plate 31e, but the present invention is not limited thereto. For example, the curved plate 31e may be attached to the surface of the partition plate 13. The curved plate 31e is not necessarily provided. For example, a part of the optical fiber guides 17 may not have the curved plate 31e.

In the above embodiment, the number of optical fiber guides 17 and the number of first dividing members 18 may be the same or different from each other. For example, the number of optical fiber guides 17 may the same as the number of termination units 2, and the number of first dividing members 18 may be less than the number of termination units 2.

In the above embodiment, the first dividing member 18 includes the first dividing body 41 and the second dividing body 51, but the present invention is not limited thereto. For example, the first dividing member 18 may include only one of the first dividing body 41 and the second dividing body 51.

In the above embodiment, the restriction parts 33 and 34 are provided, but the present invention is not limited thereto. For example, any one of the restriction parts 33 and 34 may be provided. Alternatively, the optical fiber guide may be provided with other restriction part than the restriction parts 33 and 34. The shapes of the restriction parts 33 and 34 are not specifically limited. For example, the restriction part may be a part of the sidewall parts 32b and 32c of the guide part 32.

What is claimed is:

1. An optical fiber rack comprising:
   a rack part on which a plurality of termination units arranged in a vertical direction are located;
   a first optical fiber housing part in which extra length wiring parts of a plurality of first optical fibers connected with each of the plurality of termination units are housed;
   a second optical fiber housing part in which an extra length wiring part of a second optical fiber connected with any of the plurality of termination units is housed;
   a partition plate partitioning the first optical fiber housing part from the second optical fiber housing part; and
   a plurality of optical fiber guides attached to a surface of the partition plate on a side of the first optical fiber housing part, the plurality of optical fiber guides being arranged in the vertical direction to respectively correspond to the termination units,
   wherein each of the optical fiber guides comprises a first guide part housing the first optical fibers toward to the first optical fiber housing part, and a second guide part housing the second optical fiber, the second optical fiber passing through an opening provided in the partition plate,
   wherein the second guide part is attached to the partition plate, and has a groove shape extending to protrude from the partition plate,
   wherein the first guide part is provided at a leading end of the second guide part, and has a groove shape extending in a direction crossing a protruding direction of the second guide part, and
   wherein the first guide part and the second guide part are partitioned from each other by a wall part of the first guide part on a side of the second guide part.

2. The optical fiber rack according to claim 1, wherein one of the partition plate and each of the optical fiber guides includes a curved plate, the curved plate being curved configured to restrict a position of the second optical fiber.

3. The optical fiber rack according to claim 1, wherein each of the optical fiber guides further comprises a restriction part configured to restrict a motion of the first optical fibers housed in the first guide part in the vertical direction.

4. The optical fiber rack according to claim 3, wherein each of the optical fiber guides further comprises a second restriction part.

5. The optical fiber rack according to claim 1, wherein an amount of protrusion of each second guide art associated with the plurality of optical fiber guides increases in the vertical direction.

6. The optical fiber rack according to claim 5, further comprising:
   a plurality of dividing members arranged in the vertical direction in the first optical fiber housing part,
   wherein each of the plurality of dividing members is continuously provided at a leading end of the first guide part of each optical fiber guide.

* * * * *